United States Patent [19]

Chen et al.

[11] Patent Number: 5,763,527
[45] Date of Patent: Jun. 9, 1998

[54] PACKAGING ADHESIVE HAVING LOW OXYGEN BARRIER PROPERTIES

[75] Inventors: Mai Chen, Hoffman Estates; Jeffrey H. Deitch; Grant B. Kenion, both of Crystal Lake, all of Ill.; Gerhard Krawczyk, Bremen, Germany

[73] Assignee: Morton International, Inc., Chicago, Ill.

[21] Appl. No.: 769,028

[22] Filed: Dec. 18, 1996

[51] Int. Cl.⁶ ................ C08J 3/00; C08K 3/20; C08L 75/00
[52] U.S. Cl. ............ 524/590; 525/123; 525/455; 528/85; 428/423.1
[58] Field of Search .................. 525/123, 455; 528/85; 524/590; 428/423.1

[56] References Cited

U.S. PATENT DOCUMENTS 5,331,039  7/1994  Blum et al. ............... 524/839

Primary Examiner—Patrick D. Niland
Attorney, Agent, or Firm—Wayne E. Nacker; Gerald K. White

[57] ABSTRACT

A two-part laminating adhesive is provided which joins two sheets of polymeric material, which adhesive, in cured form, provides substantially no contribution to the oxygen barrier properties of the laminate. The first part is a mixture of a polyol A), preferably a polyether, and a polymer B) formed from polymerization of $\alpha,\beta$-ethylenically unsaturated monomers, polymer B) preferably being formed in situ from monomers dissolved in polyol A). The second part is a multi-functional isocyanate, preferably an isocyanate-terminated urethane formed by reacting a poly-isocyanate monomer with a polyol.

20 Claims, No Drawings

PACKAGING ADHESIVE HAVING LOW OXYGEN BARRIER PROPERTIES

The present invention is directed to two-part urethane packaging adhesives and more particularly to an adhesive which provides substantially no barrier to oxygen transport.

BACKGROUND OF THE INVENTION

For many types of food packaging applications, such as packaging meats and cheeses, it is desirable that the packaging material transmit as little gas as possible. For such purposes, high gas barrier materials, such as nylon, ethylene/vinyl alcohol, or polyvinylidene chloride film or coatings may be employed.

On the other hand, certain foods, particularly fruits and vegetables, may maintain their freshness longest if the packaging material provides for some gas transmittance. Fruits and vegetables, though harvested, continue respiratory functions for an extended period of time, and packaging is preferably provided which allows the produce to breathe. Everyone is well acquainted with the nylon mesh bags in which citrus fruits are commonly sold, the porous bags allowing for complete exposure of the fruit to the atmosphere. Were citrus fruits to be packaged in air-tight bags, rapid rotting would occur.

Harvested fruits emit gases, particularly ethylene oxide, which hasten the fruits rotting. Air-tight packaging of fruits would, of course, result in build-up of concentrations of such gases. In fact, it is known that fruits are genetically programmed to produce such gases. A fruit is, after all, a vehicle for the species-regenerating seed, and if the fruit is not eaten and the seed thereby transported by an animal, rotting of the fruit is necessary for the seed to develop into a plant. Likewise vegetables continue some respiratory function after harvesting, though generally less than fruit.

Research has shown that different fruits and vegetables have different "breathing" requirements, and each fruit or vegetable may have its longest shelf life in packaging of specific gas barrier properties. There is a need therefore, for producers of packaging material to be able to adjust the gas barrier property of packaging material according to the specific packaging applications.

Food packaging for various types of foods often utilizes laminates of two or more sheets or films of polymeric material. The sheets or films which form the laminates may be the same material or different materials. Packaging materials to which the present invention is directed include, but are not limited to, poly(alkylenes), such as polyethylenes and polypropylenes, polyesters, and polyamides (nylon). In selecting film materials for laminates, among other considerations, the film materials may be selected for their gas barrier properties so that the laminate films, in combination, provide a predictable gas transmission rate, particularly a predictable oxygen transmission rate.

In addition to the films of the laminate, the adhesive layer(s) of the laminate also contributes to the gas barrier properties of the laminate. This may be considered undesirable, particularly when a food packager has selected or even specially ordered film material of particular gas barrier properties.

Accordingly, it is a general object of the present invention to provide a packaging adhesive having no or substantially no oxygen barrier.

SUMMARY OF THE INVENTION

In accordance with the present invention, there are provided a two-part urethane packaging adhesive and packaging laminates formed therefrom.

The first part comprises a homogeneous liquid composition of between about 20 and about 80 wt %, preferably between about 35 and about 65 wt %, of a liquid polyol A) which is a polyether, a polyester or a polyether/ester and between about 20 and about 80 wt %, preferably between about 35 and about 65 wt % of a polymer B) formed of $\alpha,\beta$-ethylenically unsaturated monomers having a weight average molecular weight between about 20,000 and about 90,000 and a hydroxyl number between about 10 and about 300, preferably between about 150 and about 250 dissolved within the polyol A). Preferably, polymer B) is formed, in situ, by dissolving $\alpha,\beta$-ethylenically unsaturated monomers in polyol A) and polymerizing the monomers to form polymer B) within the polyol A).

The second part is a polyisocyanate composition, which may be a multi-functional isocyanate monomer, but which is preferably a urethane polymer formed by reacting a polyol with a multi-functional isocyanate at an NCO/OH ratio of at least about 1.1. The second part is used relative to the first part at an NCO/OH ratio of at least 0.9, preferably 1.0 and most preferably at least about 1.1.

The components are selected such that the adhesive composition when used at a thickness of 0.05 mil to adhere two films, which in combination provide an OTR of between 250 and 300 cc/100 in$^2$/24 hr. at 75° F. and 0% relative humidity, decrease the OTR of the laminate no more than about 5% and preferably no more than about 1%.

DETAILED DESCRIPTION OF CERTAIN PREFERRED EMBODIMENTS

Herein, a composition is considered to be a liquid if it is liquid at 75° F. (23.9° C.). OTRs are measured at cc/100 in$^2$/24 hrs at 75° F. and 0% relative humidity (H.R.).

Polyol A) is preferably a polyether, e.g., a poly(alkylene oxide), such as poly(propylene oxide), poly(ethylene oxide) or ethylene oxide/propylene oxide copolymer. Most preferably, the polyol A) is poly(propylene oxide). It is necessary that polyol A) be liquid at ambient temperature, i.e., 75° F. and that a solution of polyol A) and polymer B) be liquid at 75° F., and within these constraints, the hydroxyl number may vary over a wide range, i.e., between about 25 and about 450. However, it is preferred that the hydroxyl number of polyol A) be between about 200 and about 300. The polyol preferably has a weight average molecular weight between about 300 and about 5000.

Alternatively, polyol A) may be a polyester polyol or a polyester/polyether polyol. Mixtures or polyethers, polyesters, and polyester/polyethers are also suitable. Selection of polyol A) must be within the constraints that the polyol or mixture of polyols be liquid at ambient temperature, that the first part of the adhesive composition be liquid at ambient temperature, and that as part of the cured adhesive mixture, the OTR contribution of the cured adhesive be within the ranges set forth above. Polyesters useful in accordance with the invention may be made from polyfunctional carboxylic acids (or corresponding anhydrides), such as adipic acid, isophthalic acid, terephthalic acid, sebacic acid, azelaic acid, trimellitic anhydride and polyfunctional alcohols (or corresponding alkylene oxides) such as ethylene glycol, propylene glycol, diethylene glycol, propylene glycol, 1,6-hexane diol, and neopentyl glycol.

Polymer B) is formed from $\alpha,\beta$-ethylenically unsaturated monomers, particularly acrylic monomers, and copolymerizeable $\alpha,\beta$-ethylenically unsaturated monomers such as acrylic acid, acrylamide, methyl methacrylate, ethyl methacrylate, acrylonitile, butadiene, 1,3-butylene glycol, dimethacrylate, diallyl fumarate, diallyl maleate, vinyl acetate, etc. So that polymer B) enter into the cross-linking reaction that occurs when the first and second adhesive parts are added, it is necessary that polymer B) have a hydroxyl number of between about 10 and about 300, preferably between about 150 and about 250. To this end, hydroxyl functional monomers, such as hydroxy ethyl acrylate and 1,3-butylene glycol, are incorporated in polymer B) at between about 3 and about 15 wt % of the monomer mix which forms polymer B).

Polymer B) may be formed first by solution or emulsion polymerization and then dissolved in polyol A). However, when polymer B) is pre-formed and dissolved in polyol A) there is a tendency for polymer B) to come out of solution after several days. Thus, to form a stable, homogeneous solution of polyol A) and polymer B), the first adhesive part is preferably formed by dissolving the monomers, which form polymer B), in polymer A as well as dissolving the initiator used to polymerize the polymer B) monomers. Polymer B is thereby synthesized in situ within polymer A). It may be that by forming polymer B) in situ, some chemical bonds form between polyol A) and polymer B), but this is not known. In any case, increased stability of the first adhesive part is observed when polymer B) is formed in situ within polyol A).

Monomers used to form polymer B) are generally soluble within polymer A), and these monomers may be dissolved within polymer A) without the addition of any solvent. In the end, it is highly preferred that both the first and second adhesive parts be solvent-free or substantially solvent free, i.e., containing no more than about 1 wt % organic solvent, thereby providing a zero-VOC (zero volatile organic content) adhesive composition or a low-VOC composition. However, a small amount of solvent may be added when forming the first part as any organic solvent may be stripped off after the polymerization needed to form polymer B). If polymer B) is, indeed, formed in situ, the first adhesive part is stripped as a matter of course to remove unreacted monomer which should generally remain at no more than about 300 parts per million by weight for food packaging applications. In fact, if the initiator is a solid at ambient temperature, azo bis iso butyronitile (ABIN) being a typical solid initiator used in conjunction with food packaging applications, it is convenient to add the initiator to the polyol A)/monomer solution as a solution of the initiator in organic solvent, such as methyl ethyl ketone (MEK), the solvent being eventually removed during the stripping step. Polymer B) typically has a weight average molecular weight between about 20,000 and about 90,000. Again, a constraint of on polymer B) is that the first adhesive part which is a solution of polyol A) and polymer B) be liquid at 75° F. Preferably, the viscosity of the first adhesive part is below about 10,000 cps at 75° F.

While applicants are not bound by theory, it is believed that by using two hydroxyl-functional polymers, i.e., polyol A) and polymer B), in the cross-linked structure that eventually forms by reaction of the two adhesive parts, voids are created which allow a high rate of gas transmission, particularly oxygen transmission. Accordingly, the cured adhesive contribution contributes very little or substantially not at all to the gas barrier properties of any laminate in which the adhesive is used to join sheets or films of polymeric material.

The second adhesive part, like the first adhesive part, is selected to be liquid at 75° F., and preferably likewise has a viscosity below about 10,000 cps at 75° F. The second adhesive part may be simply a liquid polyfunctional isocyanate, such as 4,4'/4,2'-diphenylmethane diisocyanate (MDI), toluene diisocyanate, hexamethlyene diisocyanate, isophoron diisocyanate, tetramethylxylene diisocyanate, etc., and mixtures thereof. However, to better enable the cured adhesive composition to meet the OTR requirements set forth above, it is preferred that the second part be an isocyanate-terminated urethane formed by reacting a polyol, such as any of those suitable as polyol A) in the first adhesive part, with a poly-functional isocyanate, such as any of those mentioned above. Typically the polyol used to form such a urethane would have a weight average molecular weight between about 300 and about 5000. To ensure that the urethane is isocyanate-terminated, the the NCO/OH ratio of the poly-functional isocyanate and the polyol must be greater than 1, typically between about 1.1 and about 10, preferably at least about 1.5 and most preferably between about 3 and about 8.

The first and second parts of the adhesive composition are shipped and stored separately, the two parts being added together at the point of application. Packaging laminates are formed from films or sheets of polymer and the adhesive in conventional manners, typically by applying the adhesive mixture to one film and then bringing the films or sheets into contact with each other. Typically, the adhesive is applied at somewhat elevated temperature, e.g., 120° F. (49° C.); however, a good adhesive bond will be formed even if the adhesive is applied and the films or sheets bonded at ambient temperature.

The invention will now be described in greater detail by way of specific example.

EXAMPLE 200 g of poly(propylene oxide), OH number 240, is charged to a reactor and heated to 78°–82° C. under a nitrogen blanket.

187.2 g butyl acrylate, 0.4 g butyl methacrylate, and 12 g hydroxy ethyl acrylate are mixed to form a monomer mix. 2 g VAZO® (ABIN) are dissolved into 20 g methyl ethyl ketone (MEK) to form an initiator solution. The monomer mix and initiator solution are fed to the reactor over 120 minutes; heating is continued for another 2 hours after the monomer is charged. Then, an additional 2 g VAZO® in MEK solution is added over 1 hr with the temperature maintained at 78°–82° C. The temperature is maintained for an additional 2 hours. Then the reaction mixture was vacuum stripped at 5 mm Hg for 2 hours at 100° C. This formed the first part of the adhesive composition.

To form the second part, 630 g poly(propylene oxide), OH no. 35, and 1180 g MDI were charged into a reactor at 75°–80° C. under a nitrogen blanket, and reacted under these conditions for four hours.

The parts were mixed at a 1:1 weight ratio and used to form laminates using sheets of oriented polypropylene (OPP) and low density polyethylene (LDPE). The sheets were each 1 mil thick, and the adhesive layer joining the sheets in each case was 0.05 mil thick. Oxygen transmission rates at 75° F., 0% relative humidity, in cc/100 in$^2$/24 hours were measured for each of these laminates and compared with the oxygen transmission rates for the two sheets together without adhesive. Results are as follows:

|  | No adhesive | Adhesive |
| --- | --- | --- |
| OPP/LDPE | 102.5 | 98.5 |
| LDPE/LDPE | 284 | 284.2 |

Thus, the adhesive composition in accordance with the invention adds substantially no barrier to oxygen transmission.

What is claimed is:

1. A two-part, water-free, substantially solvent-free, liquid adhesive composition useful for laminating a first polymeric film to a second polymeric film, said composition comprising a first part comprising between about 20 and about 80 wt % of a polyol A) selected from the group consisting of polyethers, polyesters, polyester/polyethers, and mixtures thereof, and between about 20 and about 80 wt % of a polymer B) formed of $\alpha,\beta$-ethylenically unsaturated monomers having a weight average molecular weight between about 20,000 and about 90,000 and a hydroxyl number between about 10 and about 300, said polyol A) and said polymer B) being co-dissolved so as to form a homogeneous liquid solution, and a second part comprising a polyisocyanate composition said second part being present relative to said first part at an NCO/OH ratio of at least about 0.9, said first and said second parts being formulated such that when used at a thickness of 0.05 mil to adhere two films, which in combination provide an oxygen transmission rate of between 250 and 300 cc/100 in$^2$/24 hr at 75° F. at 0% relative humidity, decrease the oxygen transmission rate of the laminate adhered with the said adhesive composition, after curing, no more than about 5%.

2. An adhesive composition according to claim 1, said first and said second parts being formulated such that when used at a thickness of 0.05 mil to adhere two films, which in combination provide an oxygen transmission rate of between 250 and 300 cc/100 in$^2$/24 hr at 75° F. at 0% relative humidity, decrease the oxygen transmission rate of the laminate adhered with the said adhesive composition, after curing, no more than about 1%.

3. An adhesive composition according to claim 1 wherein said polyol A) is poly(propylene oxide).

4. An adhesive composition according to claim 1 containing no more than about 1% by weight volatile organic component.

5. An adhesive composition according to claim 1 containing no volatile organic component.

6. An adhesive composition according to claim 1 wherein said second part is the reaction product of a poly-functional isocyanate and a polyol at an NCO/OH ratio of at least about 1.1.

7. An adhesive composition according to claim 6 wherein said polyol has a weight average molecular weight between about 300 and about 5000.

8. An adhesive composition according to claim 1 wherein said second part is present relative to said first part at an NCO/OH ratio of at least about 1.0.

9. An adhesive composition according to claim 1 wherein said second part is present relative to said first part an an NCO/OH ratio of at least about 1.1.

10. A laminate comprising a first and a second sheet of polymeric material adhered by said adhesive composition of claim 1.

11. A two-part, water-free, substantially solvent-free liquid adhesive composition useful for laminating a first polymeric film to a second polymeric film, said composition comprising a first part comprising between about 20 and about 80 wt % of a polyether polyol A), and between about 20 and about 80 wt % of a polymer B) formed of $\alpha,\beta$-ethylenically unsaturated monomers having a weight average molecular weight between about 20,000 and about 90,000 and a hydroxyl number between about 10 and about 300, said polyether polyol A) and said polymer B) being co-dissolved so as to form a homogeneous liquid solution, and a second part comprising a polyisocyanate composition said second part being present relative to said first part at an NCO/OH ratio of at least about 0.9, said first and said second parts being formulated such that when used at a thickness of 0.05 mil to adhere two films, which in combination provide an oxygen transmission rate of between 250 and 300 cc/100 in$^2$/24 hr at 75° F. at 0% relative humidity, decrease the oxygen transmission rate of the laminate adhered with the said adhesive composition, after curing, no more than about 5%.

12. An adhesive composition according to claim 11, said first and said second parts being formulated such that when used at a thickness of 0.05 mil to adhere two films, which in combination provide an oxygen transmission rate of between 250 and 300 cc/100 in$^2$/24 hr at 75° F. at 0% relative humidity, decrease the oxygen transmission rate of the laminate adhered with the said adhesive composition, after curing, no more than about 1%.

13. An adhesive composition according to claim 11 wherein said polyol A) is poly(propylene oxide).

14. An adhesive composition according to claim 11 wherein said polymer B) is formed, in situ, from polymerization of $\alpha,\beta$-ethylenically unsaturated monomers dissolved in said polyol A).

15. A laminate comprising a first and a second sheet of polymeric material adhered by said adhesive composition of claim 11.

16. A two-part, water-free, substantially solvent-free, liquid adhesive composition useful for laminating a first polymeric film to a second polymeric film, said composition comprising a first part comprising between about 20 and about 80 wt % of a polyol A) selected from the group consisting of polyethers, polyesters, polyester/polyethers, and mixtures thereof, and between about 20 and about 80 wt % of a polymer B) formed of $\alpha,\beta$-ethylenically unsaturated monomers having a weight average molecular weight between about 20,000 and about 90,000 and a hydroxyl number between about 10 and about 300, said polyol A) and said polymer B) being co-dissolved so as to form a homogeneous liquid solution, and a second part comprising a polyisocyanate composition said second part being present relative to said first part at an NCO/OH ratio of at least about 0.9, said polymer B) being formed, in situ, from polymerization of $\alpha,\beta$-ethylenically unsaturated monomers dissolved in said polyol A)

said first and said second parts being formulated such that when used at a thickness of 0.05 mil to adhere two films, which in combination provide an oxygen transmission rate of between 250 and 300 cc/100 in$^2$/24 hr at 75° F. at 0% relative humidity, decrease the oxygen transmission rate of the laminate adhered with the said adhesive composition, after curing, no more than about 5%.

17. An adhesive composition according to claim 16, said first and said second parts being formulated such that when used at a thickness of 0.05 mil to adhere two films, which in combination provide an oxygen transmission rate of between 250 and 300 cc/100 in$^2$/24 hr at 75° F. at 0% relative humidity, decrease the oxygen transmission rate of the laminate adhered with the said adhesive composition, after curing, no more than about 1%.

18. An adhesive composition according to claim 16 wherein said polyol A) is a polyether.

19. A laminate comprising a first and a second sheet of polymeric material adhered by said adhesive composition of claim 16.

20. An adhesive composition according to claim 6 containing no more than about 300 parts per million by weight unreacted $\alpha,\beta$-ethylenically unsaturated monomers.

* * * * *

UNITED STATES PATENT AND TRADEMARK OFFICE
CERTIFICATE OF CORRECTION

PATENT NO.   :   5,763,527
DATED        :   June 9, 1998
INVENTOR(S)  :   Chen et al.

It is certified that error appears in the above-indentified patent and that said Letters Patent is hereby corrected as shown below:

*Column 8, line 8, "6" should be --16--.*

Signed and Sealed this

Eighteenth Day of August, 1998

Attest:

BRUCE LEHMAN

*Attesting Officer*                *Commissioner of Patents and Trademarks*